United States Patent [19]
Saunders

[11] 3,793,110
[45] Feb. 19, 1974

[54] MANUFACTURE OF WATER TIGHT PROTECTIVE COVERINGS

[76] Inventor: Clare C. Saunders, 525 Lexington Ave., New York, N.Y. 12452

[22] Filed: Feb. 22, 1971

[21] Appl. No.: 117,380

[52] U.S. Cl................ 156/247, 156/252, 156/273, 156/289, 156/306, 2/68, 117/4
[51] Int. Cl...................... B32b 31/00, A42b 1/12
[58] Field of Search... 156/306, 247, 252, 273, 289; 2/68; 117/4

[56] References Cited
UNITED STATES PATENTS

| | | | |
|---|---|---|---|
| 1,974,203 | 9/1934 | Collins | 2/68 |
| 2,730,720 | 1/1956 | Saunders | 2/68 |
| 3,020,186 | 2/1962 | Lawrence | 156/251 |
| 3,070,805 | 1/1963 | Bozocos | 2/68 |
| 3,075,862 | 1/1963 | Hoyer | 156/251 |
| 3,419,447 | 12/1968 | Hewitt | 156/251 |
| 3,465,627 | 9/1969 | Vigneault | 117/4 X |

Primary Examiner—Alfred L. Leavitt
Assistant Examiner—M. F. Esposito
Attorney, Agent, or Firm—James P. Malone

[57] ABSTRACT

A water tight covering, e.g., a bathing cap, limb covering, etc. having at its mouth, an inner, annular coated margin of pressure-sensitive adhesive overlain by a strippable tape is constructed by juxtaposing two films of thin, flexible thermoplastic material. Each film has an outwardly facing straight narrow zone covered with a pressure sensitive adhesive. The zones on the two films are registered. On each film, the adhesive is backed by a thin, flexible vehicle web which is not readily autogenuously welded. The juxtaposed films, together with the vehicle webs, are placed between a platen and a rule die of a high frequency dielectric welding device. Die strips of the rule die cut along the entire outline of the protective covering and peripherally bond the juxtaposed films except at the mouth of the covering. Portions of the vehicle webs are coincident with the mouth of the protective covering and are cut by the die to form the strippable tapes. The webs are not affected by the dielectric bonding operation yet allow portions of the films which are sandwiched between the webs and the adhesive coatings to bond together. The covering is subsequently turned inside out. Because the webs do not bond to the films, they can be easily peeled off to expose the pressure sensitive adhesive.

11 Claims, 6 Drawing Figures

PATENTED FEB 19 1974　　3,793,110
SHEET 1 OF 2
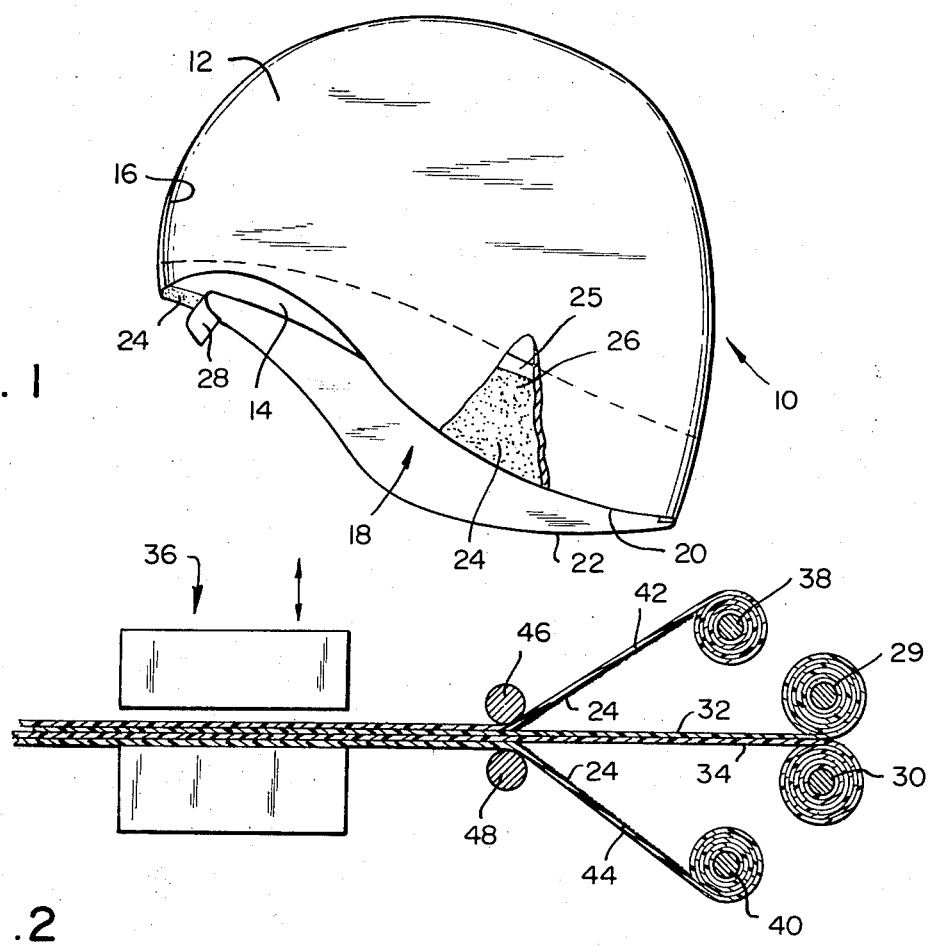
FIG. 1
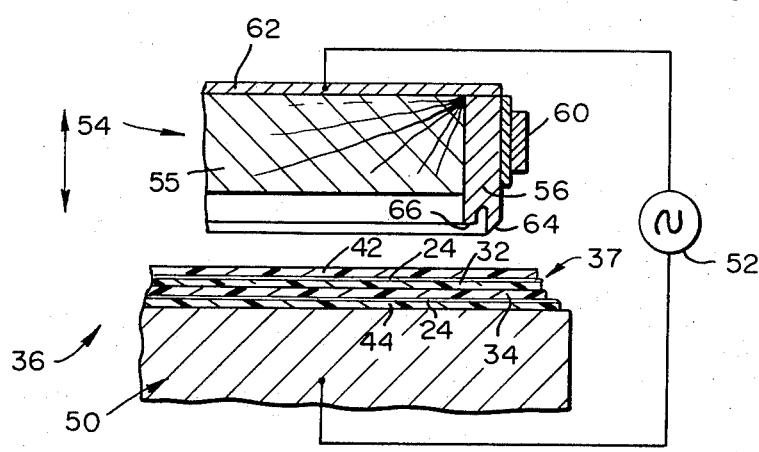
FIG. 2
FIG. 4
INVENTOR
CLARE C. SAUNDERS
BY
Natter, Wigman & Natter
ATTORNEYS

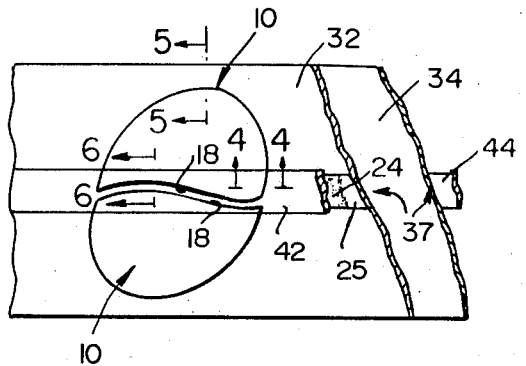
FIG. 3
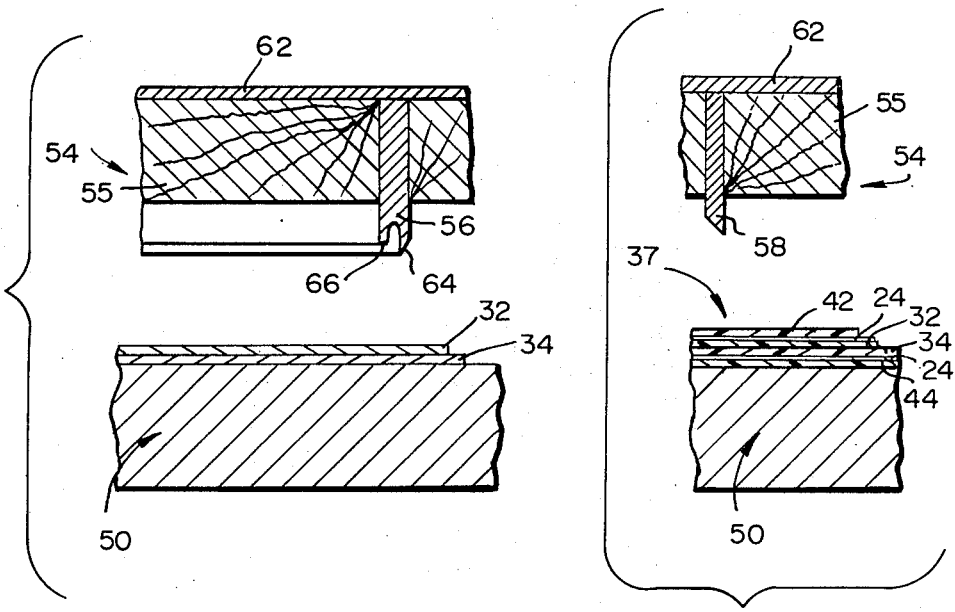
FIG. 5
FIG. 6

MANUFACTURE OF WATER TIGHT PROTECTIVE COVERINGS

BACKGROUND OF THE INVENTION

1. Field of the Invention

Manufacture of protective coverings having inner annular margins of pressure-sensitive adhesive peripherally surrounding the mouths thereof.

2. Description of the Prior Art

Water tight protective coverings formed of a film of plastic material and having an access opening, i.e., a mouth, through which a projecting extremity, e.g., a limb, a portion of the user's head, etc., is inserted, have been in use heretofore. Among these devices, it has been found that one of the most effective means for the exclusion of water from the interior of the covering through the mouth was with the use of a coating of pressure-sensitive adhesive applied along the inner annular margin of the mouth. Such protective coverings are more fully described in my prior U.S. Pat. No 2,730,720.

A problem encountered with coverings of the type described in my prior patent and hindering their widespread use was the fact that the application of a coating of adhesive to the margin around the mouth has been a cumbersome manufacturing step which contributed a major factor to total production costs.

Heretofore, the coating of pressure-sensitive adhesive was applied through the use of a roller. The roller spread the tacky adhesive which was previously placed on the mouth margin. Unfortunately, such use of rollers is seldom economical except when applying adhesives to relatively large surfaces, not such surfaces as are defined by the marginal zone of a relatively small narrow area of the coverings. Difficulty was encountered in obtaining an even thickness of adhesive application as well as in keeping the adhesive only in the marginal zone. Furthermore, because the coating of adhesive was subsequently covered by a strippable tape (which is removed prior to use) it was necessary to subsequently apply the tape in a separate step.

Among other attempts at adhesive application which were unsatisfactory was application by brush which permitted adhesive application to only a small segment of a surface. However, uniform thickness of deposited adhesive proved difficult to achieve. Additionally, the brush application of adhesive is not particularly suitable for pressure-sensitive adhesives or subsequent application of a strippable tape. Furthermore, such application is not adapted for economical mass production.

SUMMARY OF THE INVENTION

A rule die of a high frequency dielectric welding apparatus cuts the periphery of a protective covering along the entire outline thereof, one portion of which includes only two juxtaposed thermoplastic films and another portion of which includes an outwardly facing narrow zone of the two juxtaposed films, each covered by a pressure sensitive adhesive backed web with the adhesive facing the film. The narrow covered zones correspond with the mouth of the covering. Dielectric sealing is utilized along the periphery of the covering except at the mouth. The webs are of a material which is not readily adapted for dielectric welding, yet permits portions of the film sandwiched between the webs at the ends of the mouth to be dielectrically seamed together without seaming the webs to each other or to the films. Subsequently, the covering is turned inside out and the cut portions of the webs within the covering are stripped, leaving an adhesive coating to seal the mouth of the covering around a projecting extremity of the user.

It is an object of the invention to provide a method of manufacture of water tight coverings of the general character described having an inner annular margin of pressure-sensitive adhesive which method is not subject to any of the foregoing disadvantages.

More specifically, it is an object of the present invention to provide a method of manufacture of water tight coverings of the general character described having an inner annular margin of pressure-sensitive adhesive which method is well adapted for mass production techniques and results in a covering, the manufacturing costs of which are appreciably less than prior devices designed to serve the same function.

Yet another object of the present invention is to provide a method of manufacture of water tight protective coverings of the general character described having an inner annular margin of pressure-sensitive adhesive which method includes cutting the outline of protective covering through two registered thermoplastic films and peripherally sealing the films except at the mouth of the enclosure and with the film portions at the ends of the mouth being sealed while sandwiched between pressure sensitive adhesive backed webs.

Other objects of the invention in part will be obvious and in part will be pointed out hereinafter.

The invention accordingly consists in the method of manufacture and series of steps which will be exemplified in the process hereinafter described and of which the scope of application will be indicated in the appended claims.

BRIEF DESCRIPTION OF THE DRAWINGS

In the accompanying drawings in which is shown an exemplification of the manufacture of water tight protective coverings in accordance with the invention, FIG. 1 is a perspective view of a bathing cap constructed in accordance with the invention with portions broken away for clarity and illustrating strippable tapes, a portion of one of which is partially peeled away, thereby exposing an inner margin coated with a pressure-sensitive adhesive and surrounding the mouth of the cap;

FIG. 2 is a schematized elevational view with portions in section taken substantially through a production line adapted to construct protective coverings in accordance with the invention and illustrating a pair of spindles from which are fed coiled rolls of film to mutually juxtaposed horizontal positions at a cutting and sealing station; additionally shown are a pair of spindles adapted to feed an elongate adhesive backed web to a straight narrow zone extending along the exterior face of each of the films and with the webs and films passing between compression rollers to pressure transfer the adhesive to the narrow zone on each of the films;

FIG. 3 is an auxiliary plan view of the films and webs on a bed platen of a high frequency dielectric welding device with portions of the webs and films broken away;

FIGS. 4, 5 and 6 are enlarged fragmentary sectional views through both the bed platen and a rule die of the dielectric welding device; said views being taken substantially along the lines 4—4, 5—5 and 6—6 respectively of FIG. 3.

DESCRIPTION OF THE PREFERRED EMBODIMENT

Referring now in detail to the drawings, the reference numeral 10 denotes a typical covering constructed in accordance with the method of the present invention. The covering 10 is shown in an exemplary fashion, as a bathing cap, and includes two registered water and moisture impervious side panels 12, 14 which are sealed along a common seam 16. In order to accommodate the user's head, the covering is substantially hemispherically shaped when opened and the seam 16 is generally C-shaped.

It should be noted that the panels 12, 14 are inwardly turned at their common seamed peripheral edges so that, in effect, the seam 16 joining the panels extends as an inturned peripheral bead. This is because in accordance with the method of the present invention, the covering is cut and seamed with the panels lying flat and is subsequently turned inside out before it is donned.

The covering 10 additionally includes an access opening 18 through which a projecting extremity e.g. head, arm, etc. of the user may be inserted to thereby prevent moisture or water from contacting the extremity. This access opening or mouth 18 is bounded by a pair of lower edges 20, 22 of the panels 12, 14, respectively, The cap, as illustrated in FIG. 1, is adapted to enclose the hair on a user's head and protect the same from the deleterious effects of water. In order to preclude the entrance of water into the interior of the cap through the mouth, portions of the cap in an interior margin adjacent the lower edge of each panel are coated with a layer of pressure-sensitive adhesive 24. The adhesive is adapted to adhere to the user's skin thereby bringing the panels of the cap in sealing engagement therewith. The upper edge of the adhesive coated margin lies along a substantially straight line while the lower edge is registered with the lower edges of the panels.

A flexible resilient strippable tape 26, 28 overlaps the adhesive coating on the panels 12, 14, respectively, and extends toward the top of the panel to a straight upper edge which leaves an adhesive free border 25 adjacent the upper edge of the coated margin to thereby facilitate gripping of the tapes 26, 28 for removal. Optionally, the upper edges of the adhesive coating and tapes may be registered. The lower edge of each tape is registered with the lower edge of the respective panel and in accordance with this invention is simultaneously cut with the panel edges 20, 22. The covering 10 is used in the general manner as described in my previous U.S. Pat. No. 2,730,720 and it has been found that a most economical method of mass production manufacture of the coverings is in accordance with the process to be hereinafter described.

Referring now to FIG. 2 wherein a schematized sectional view through a production line particularly designed for construction of the coverings 10 is shown, a pair of spindles 29, 30 carrying coils of flexible thermoplastic films 32, 34 respectively are shown journalled for rotation along vertically spaced parallel horizontal axes at one end of the production apparatus. The films 32, 34 are formed of any suitable water impervious flexible thermoplastic which is readily adapted for high frequency dielectric heat sealing, e.g., polyvinyl chloride, etc. The films 32, 34 are fed from the spindles 29, 30 into a cutting and sealing station 36.

Each film 32, 34 is intermittently drawn from its respective spindle 29, 30 along a generally horizontal plane to a juxtaposed and substantially mutually abutting position at the sealing station. From an observation of FIG. 3 wherein the outline of cut and sealed coverings 10 are shown in their respective positions along the films, it will be seen that the width of each film 32, 34 is suitable for the simultaneous cutting of two opposed coverings 10 with the mouth 18 of each covering positioned adjacent the center of the films. With the coverings 10 cut from the films in this pattern, the coating of adhesive 24 is applied along a single narrow straight zone 37 extending along an axis coincident with the center of the face of each film.

In accordance with the manufacturing technique of the present invention, each covering 10 is formed at the cutting and sealing station 36 in an inverted, i.e., inside out position. Fabrication under this technique facilitates the simultaneous application of the adhesive 24 and the strippable tapes for most economical mass production.

The adhesive 24 is simultaneously applied to each film 32, 34 along with a vehicle carrier which, when cut, forms the strippable tape to be removed by the user before application of the protective covering 10. The vehicle carrier thus serves a dual function, i.e., supplies the adhesive for coating the margins and provides the strippable tapes. The adhesive 24 is coiled on spindles 38, 40 as a backing on the vehicle carrier which extends from respective spindles as a thin flexible adhesive backed continuous film like web 42, 44. The spindles 38, 40 are journalled for rotation along vertically spaced horizontal axes lying parallel to the axes of the film spindles 29, 30.

To transfer the adhesive 24 from the webs 42, 44 to the films 32, the webs as well as the films 32, 34 are fed between a pair of pressure rollers 46, 48 which compress the webs toward each of the respective films thereby transferring the adhesive 24 from the web to its respective film. This is because the pressure sensitive adhesive 24 has a greater affinity for the surface texture of the films than that of the webs. If desired, the rollers 46, 48 may be heated to further assist the transfer of the adhesive 24. It should also be noted, of course, that the adhesive coating on the webs are on the sides of the webs 42, 44 which abut the respective films 32, 34 so that the adhesive coating is against one of the opposite outwardly facing surfaces of the films.

As has been previously mentioned, the films 32, 34 from which the panels 12, 14 are cut, are flexible and formed of a thermoplastic which is readily adapted to high frequency dielectric heating sealing, e.g., polyvinyl chloride, while the webs 42, 44 from which the strippable tapes 26, 28 are cut are formed of a thin flexible material which is not readily suitable for dielectric sealing, e.g., polyethylene film, coated paper, etc. When the films 32, 34 with their central straight narrow zones 37 of adhesive 24 covered by the webs 42, 44 are at the cutting and sealing station 36, the peripheral outline of the cap is cut through the appropriate thicknesses of film and at the zones 37 through thicknesses of films 32, 34, webs 42, 44 and adhesive. The peripheral edges are sealed except along the edges 20, 22 of the mouth 18. Upon completion of the cutting and sealing operation, the coverings 10 are stripped from the films 32, 34 and are suitable for either direct customer usage with the ultimate customer inverting the covering before donning, or for inversion in the manufacturing facility so that the customer need only don the enclosure and strip the tapes 26, 28.

The cutting and sealing station 36 includes a high frequency dielectric welding device having a bed platen 50 which is electrically conductive to act as a platen electrode that is energized by a high frequency oscillator 52. One terminal of the oscillator is connected to the platen electrode as schematically illustrated in FIG. 4. The periphery of the covering 10 is cut from the films 32, 34 and webs 42, 44 and the peripheral seam 16 is formed through cooperation between the platen 50 and a rule die 54 movable toward and away from the platen. The rule die 54 includes a block 55 of electrically non-conductive material, e.g., plywood. Steel rule die strips 56, 58 extend through kerfs in the plywood block 55 and a metal chase 60 peripherally compresses the block to bind the block and the die strips together. The lower edges of the steel rule die strips 56, 58 project beneath the block and define the closed peripheral shape of a flat protective covering 10. The die strips 56, 58 appropriately extend against the films 32, 34 and/or film and webs 42, 44 (in the zones 37) when the movable rule die 54 is lowered.

If the covering 10 is a cap, the steel rule die strip 56 is generally "C" shaped in plan configuration and forms the seam 16. From an observation of FIG. 4, it will be seen that the upper edge of the die strip 56 is electrically interconnected to the other terminal of the oscillator 52 as by an electrically conductive electrode film or layer 62. It should be noted that the die strip 56 includes a depending external knife edge 64 which extends below and is substantially parallel with an internal sealing edge 66 which forms the seam 16. The knife edge 64 serves to cut the peripheral edge of the covering 10 through the films 32, 34 (see FIG. 5) as well as through the films 32, 34, the webs 42, 44 and the adhesive layers 24 in the straight narrow zone 37 (see FIG. 4). Optionally, the knife and sealing edges of the die strip 56 may be constructed as edges of separate die strips positioned in spaced kerfs.

The lower edges 20, 22 of the panels 12, 14, which define the mouth 18, are cut through the films 32, 34, the webs 42, 44 and layers of adhesive 24, by the die strip 58 (see FIG. 6) which includes a depending knife edge 64.

In operation, the films 32, 34 are fed from their respective spindles. At the same time, the adhesive backed webs 42, 44 are fed from their respective spindles at the same intermittent feed rate coincident with the cycle time of the dielectric welding device. The films and webs are drawn between the pressure rollers 46, 48 which force the pressure sensitive adhesive 24 against the films to tenaciously cling to the opposed straight narrow zones 37 of each film. The pressure rollers may be power driven to effect the feeding of the films and webs from their rolls. For each cycle of the welding device, an appropriate length of films with their adhesive and web covered zones are fed into the cutting and sealing station 36 and between the bed platen 50 and the rule die 54.

At the commencement of the welding cycle, the rule die 54 is lowered over the platen and pressed against the films, and the film web and adhesive layer sandwich (in the straight narrow zone 37). This effects the cutting of the peripheral outline of a covering 10 through the films and webs by the rule knife cutting edges. Thereupon, the high frequency oscillator 52 is energized. The high frequency oscillations between the die strips 56 and the platen 50 result in a dielectric heating of the films 32, 34 which autogenously fuses the films 32, 34 along the seam 16.

Although the precise reason is not fully understood, it has been found that in the region of the zone 37 wherein each film 32, 34 is covered by a layer of adhesive 24 and a thickness of web 42, 44 which spaces the film 32 from the sealing edge 66 of the die strip 56 (see FIG. 4) and the film 34 from the platen electrode, the films are dielectrically heated and seamed without bonding the webs to each other or to the films. A possible reason for this phenomenon could be that the dielectric constant of the web material is such that it is not responsive to the frequencies used to seam the polyvinyl chloride film. It has been found that webs formed of polyethylene film function quite satisfactorily in this manner.

From a comparison of the width of the sealing edge 66 as shown in FIGS. 4 and 5, it will be observed that the seam 16 is widened in the region of the zone 37 for added strength at the ends of the covering mouth 18.

After the seam 16 has been autogenously fused, the movable rule die 54 is raised and the individual coverings 10 are stripped from the films 32, 34. It will be appreciated that when the coverings 10 are stripped, the portions of the coverings at the mouths 18 will include cut portions from each of the webs 42, 44 which web portions now constitute the strippable tapes 26, 28 of the covering 10.

As has been previously mentioned, the coverings 10 may be inverted, i.e., turned inside out, at this point (prior to packaging and shipping). Optionally, they may be packaged and shipped in their "as stripped" state. Under these circumstances, it is necessary for the user to invert the coverings prior to donning.

The donning of the coverings to protect a projecting extremity is simply accomplished by inserting the extremity into the inverted covering through the mouth 18, and subsequently stripping the tapes 26, 28 thereby exposing the coatings of adhesive 24 in margins adjacent the lower edges of the side panels. The mouth is brought into sealing engagement with the user's skin by merely pressing the side panels 12, 14 against the user's skin to bring the pressure sensitive adhesive into contact therewith. It will also be appreciated that the strippable tapes 26, 28 may be reapplied over the coating of adhesive 24 so that the covering 10 may be stored and subsequently reused.

Although the operation of the high fequency dielectric welding device has been described with respect to a rule die 54 having die strips for the cutting and sealing of a single covering 10, several coverings can be simultaneously formed with multiple rule dies. Furthermore, multiple dies would be advantageous when forming coverings from films wherein the narrow adhesive and web covered zones 37 are centrally positioned and the coverings are oriented such that opposed mouths face each other and overlie different portions of the same length of the zones as illustrated in FIG. 3.

Thus it will be appreciated that there is provided a process for constructing water tight protective coverings which achieves the various objects of the invention and is well suited for economical mass production manufacture.

As various changes might be made in the method above set forth, it is to be understood that all matter herein described or shown in the accompanying drawings is to be interpreted as illustrative and not in a limiting sense.

Having thus described the invention, there is claimed as new and desired to be secured by Letters Patent:

1. A method of manufacturing protective coverings having an access opening with an inner annular coated margin of pressure-sensitive adhesive, said method comprisng juxtaposing two flexible thermoplastic films which are autogeneously weldable, covering registered facing zones of each film with one each of two flexible vehicle webs carrying a film facing pressure sensitive adhesive and with each web being formed of a material not readily autogenously weldable under the same conditions which effect autogenous welding of the films, placing the films and webs between a platen and a rule die of a high frequency welding apparatus with the film zones in registry with the access opening of a protective covering outlined in the rule die, cutting the outline of a protective covering through the films and the films, adhesive coatings and webs at the film zones, dielectrically welding portions of the films to form a peripheral seam of the covering of a first width, dielectrically welding the film ends of the access opening with a sealing edge at the film ends wider than said first width through the adhesive and webs on the zone of each film and stripping the cut covering from the films and webs.

2. A method in accordance with claim 1 wherein the film ends of the access opening are dielectrically welded simultaneously with the peripheral seam of the covering.

3. A method in accordance with claim 1 further including the step of forcing rule die strips through the films and webs to cut the outline of the covering.

4. A method in accordance with claim 3 wherein the outline of the covering is cut through the films before the peripheral seam is welded.

5. A method in accordance with claim 1 further including the step of pressure transferring the adhesive coating from the webs to the films by feeding the webs and films between pressure rollers prior to cutting the outline of the covering through the films.

6. A method in accordance with claim 1 further including the step of inverting the covering after stripping the covering from the films.

7. A method in accordance with claim 6 further including the step of stripping the cut web portions to expose the adhesive coating.

8. A method in accordance with claim 1 wherein the outwardly facing zone extends along a central axis of each film, said method further including the step of simultaneously cutting the outline of two opposed coverings with the access openings of each covering overlying different portions of the same length of the film zones.

9. A method in accordance with claim 8 wherein the peripheral seams of both coverings are simultaneously welded.

10. The method as in claim 1, plus the step of turning the cut covering inside out to provide a covering which will adhere to the user after said webs have been stripped off said films.

11. A method in accordance with claim 1 wherein the dielectric pressure is equalized, to prevent damage to the webs from excessive pressure, by a slightly lowered welding edge of the rule die in the peripheral zones above the thickened web zones at the access mouth of the covering.

* * * * *